United States Patent
Gueugneau et al.

(10) Patent No.: US 9,352,522 B2
(45) Date of Patent: May 31, 2016

(54) MOLDING ELEMENT OF A MOLD FOR A TIRE, COMPRISING A PLURALITY OF HOLES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Anthony Gueugneau, Clermont-Ferrand (FR); Etienne Blanchet, Clermont-ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/436,530
(22) PCT Filed: Oct. 1, 2013
(86) PCT No.: PCT/EP2013/070391
§ 371 (c)(1),
(2) Date: Apr. 17, 2015
(87) PCT Pub. No.: WO2014/060207
PCT Pub. Date: Apr. 24, 2014

(65) Prior Publication Data
US 2015/0283769 A1 Oct. 8, 2015

(30) Foreign Application Priority Data
Oct. 17, 2012 (FR) ...................................... 12 59899

(51) Int. Cl.
*B29D 30/06* (2006.01)
*B29C 33/10* (2006.01)

(52) U.S. Cl.
CPC ........ *B29D 30/0606* (2013.01); *B29D 30/0629* (2013.01); *B29C 33/10* (2013.01); *B29D 2030/0612* (2013.01); *B29D 2030/0613* (2013.01); *B29D 2030/0614* (2013.01); *B29D 2030/0617* (2013.01)

(58) Field of Classification Search
CPC ................... B29D 30/0606; B29D 2030/0612; B29D 2030/0613; B29D 2030/0614; B29D 2030/0617; B29C 33/10
See application file for complete search history.

(56) References Cited

U.S. PATENT DOCUMENTS

| 3,804,566 A | 4/1974 | Kimura et al. |
| 7,290,996 B2 * | 11/2007 | Tanaka ............... B29D 30/0629 425/28.1 |
| 2002/0119209 A1 | 8/2002 | Tanaka |
| 2006/0188593 A1 | 8/2006 | Tanaka |

(Continued)

FOREIGN PATENT DOCUMENTS

| DE | 4243962 | 6/1994 |
| DE | 102004028462 | 12/2005 |

(Continued)

OTHER PUBLICATIONS

International Search Report for Application No. PCT/EP2013/070391 dated Dec. 20, 2013.

*Primary Examiner* — James Mackey
(74) *Attorney, Agent, or Firm* — Dickinson Wright PLLC

(57) ABSTRACT

A molding element for a tire mold manufactured from a metallic powder fused together layer by layer, having a body, comprising a first surface intended to mold all or part of a tread surface of the tire and a second surface opposite to the first surface and intended to be in contact with another part of the mold, the thickness (E) of the body of the molding element being between 1 and 6 millimetres. The molding element has at least one cavity opening onto the second surface of this body. The molding element also has a plate positioned across the cavity and formed as one with the body of the molding element, being at the same level as the first surface of the body, and having at least one hole allowing air to pass between the first surface of the molding element and the second surface thereof.

4 Claims, 2 Drawing Sheets

(56) References Cited

U.S. PATENT DOCUMENTS

2009/0162465 A1* 6/2009 Komornik ............ B22F 3/1109
425/47
2011/0318532 A1* 12/2011 Dusseaux .......... B29D 30/0629
428/141

FOREIGN PATENT DOCUMENTS

| DE | 102004052766 | 4/2006 |
|----|--------------|--------|
| GB | 1358329 | 3/1974 |
| WO | 2010076502 | 7/2010 |

* cited by examiner

MOLDING ELEMENT OF A MOLD FOR A TIRE, COMPRISING A PLURALITY OF HOLES

This application is a 371 national phase entry of PCT/EP2013/070391, filed 1 Oct. 2013, which claims benefit of French Patent Application No. 1259899, filed 17 Oct. 2012, the entire contents of which are incorporated herein by reference for all purposes.

BACKGROUND

1. Field

The present disclosure relates to a molding element obtained by sintering and comprising particular venting means. The molding element is intended to be arranged in a tire mold, notably a mold of the segmented type.

2. Description of Related Art

A segmented mold comprises several separate parts which, when brought relatively closer together, delimit a molding space of toroidal overall shape. In particular, a segmented mold comprises two lateral shells for molding the sidewalls of the tire and several peripheral segments situated between the shells for molding the tread of the tire. All of these parts are brought closer together with suitable dynamics thanks to a determined mechanism.

In order to mold the tread, the mold segments comprise molding elements. What is meant by a molding element is an element of the mold which comprises a molding surface that allows part of the tread of a tire to be molded.

It is possible to create a molding element using a selective fusion method more commonly referred to as sintering. This method uses a beam of energy to fuse a metallic powder. A "beam of energy" means electromagnetic radiation (for example a laser beam) or a beam of particles (for example an electron beam).

A sintering method using a laser, hereinafter referred to as a laser sintering method, is known from document EP1641580. In that document, a first layer of metallic powder is spread on a plate. All or some of the particles of this first layer of powder are then agglomerated by the beam of a laser according to the shape of the object that is to be obtained. Once this step has been performed, a second layer of powder is spread on the first layer of powder so that it in turn can be selectively fused using the laser. By repeating these operations of spreading the layer and fusing using a laser, a sintered object is built up layer by layer.

Document WO2010/076502 discloses a particular molding element obtained using this laser sintering technique. This molding element, referred to as a skin, is of small thickness and is intended to be placed in a mold. In order to avoid air being trapped between the mold and a green tire during an operation of vulcanizing this tire, it is necessary to provide venting means in the molding element.

Documents DE102004028462 and DE102004052766 disclose examples of such venting means. More particularly, these documents disclose a mold part comprising a molding element obtained by laser sintering and an interface element interfacing with the rest of the mold. This interface element is not sintered and is secured to the molding element. The molding element throughout its volume comprises a plurality of pores forming small-sized cavities. These cavities are able to guide the air towards drillings formed in the interface element and opening to the rear of this interface element. However, the presence of a high number of pores in the molding element reduces the material density of this element and makes it more fragile to mechanical loading. Thus, the venting solutions disclosed in documents DE102004028462 and DE102004052766, if applied to the molding element of document WO2010/076502, would make the latter element too fragile because of its small thickness. Furthermore, in documents DE102004028462 and DE102004052766, it is necessary to provide an additional operation of making a hole in the interface element.

Document DE19628166 discloses another venting solution in which provision is made for an insert to be attached in a hole produced beforehand within the depth of the molding element. The insert comprises a hollow cylindrical body and a platelike head formed as an integral part of this body. The head comprises a plurality of holes opening into the hollow part of the cylindrical body. The depth of the holes is limited to the thickness of the plate so as to reduce the risks of these holes becoming fouled and to encourage the removal of air via the hollow body of the insert. The use of an insert attached into the molding element does, however, make this solution complex and costly.

There is therefore a need to offer a simple and economical venting solution for a molding element of a tire mold.

DEFINITIONS

A "tire" means all types of resilient tread whether or not it is subjected to an internal pressure.

A "tread" of a tire means a quantity of rubbery material delimited by lateral surfaces and by two main surfaces one of which is intended to come into contact with a roadway when the tire is running A "cut" in a tread means the space delimited by walls of material that face one another and are distant from one another by a non-zero distance.

A "mold" means a collection of separate parts which, when brought relatively closer together, are able to delimit a toroidal molding space.

The "equivalent diameter" of a hole means the diameter of the circle inscribed inside this hole.

A "plate" of a molding element means a portion of this element having a thickness that is small by comparison with the thickness of this element.

A "plate at the same level as the first surface of the body" means that the upper surface of this plate lies flush with this first surface of the body.

A "pattern" on the tire means a decoration on this tire capable of improving its overall appearance and/or of providing technical or legal information regarding this tire.

SUMMARY

The invention, in an embodiment, relates to a mold for a tire manufactured from a metallic powder fused together layer by layer. The molding element comprises a body, this body comprising a first surface intended to mold all or part of a tread surface of the tire and a second surface opposite to the first surface and intended to be in contact with another part of the mold. The thickness of the body of the molding element is comprised between 1 and 6 millimetres and the molding element comprises at least one cavity opening onto the second surface of this body. The molding element comprises a plate positioned across the cavity and formed as one with the body of the molding element, this plate being at the same level as the first surface of the body. The plate comprises at least one hole allowing air to pass between the first surface of the molding element and the second surface thereof.

The plate across the cavity makes it possible to control the removal of air through the holes. In this instance this plate is manufactured at the same time as the body of the molding element while the metallic powder is being fused together. The invention, in its embodiments, thus makes it possible to propose a venting solution that is simple and economical.

In one alternative form of the embodiment, the plate comprises a plurality of holes forming a grid structure on this plate, these holes having an equivalent diameter comprised between 0.05 mm and 1 mm.

The dimensions of the holes in the plate and the arrangement of these holes make it possible to limit the penetration of rubber into the plate when the mold is closed. This then prevents protruding bits of vulcanized rubber from appearing on the tread surface of the tire and therefore improves the overall appearance of this tire.

In one preferred embodiment, the grid structure of holes forms a marking on the molding element. This marking is intended to mold a pattern on the tire.

By organizing the grid of holes in such a way that it is able to create a predefined pattern on the tire, the overall appearance of the tire is improved.

In one alternative form of the embodiment, the molding element comprises a plurality of protrusions projecting from the first surface of the body of the molding element and intended to mold cuts in the tread of the tire, at least two protrusions of the plurality of protrusions intersecting on this first surface, and in which the hole or holes in the plate opens or open at the intersection of the two protrusions.

The point at which the protrusions intersect on the first surface of the body is particularly critical because a large amount of air can build up at this point as the mold is closed over the green tire. By making the holes in the plate open onto the intersection of two protrusions, it becomes easier to discharge air from the mold and the appearance of surface defects on the tread once this tread has been vulcanized is limited.

In one alternative form of embodiment, the molding element comprises a lateral surface connecting the first surface of the body of the molding element to the second surface thereof, the molding element comprising a porous area connecting the cavity to the lateral surface, this porous area forming all or part of the second surface of the body of the element.

The second surface of the molding element will come into contact with another part of the mold. Contact between the molding element and this other part of the mold is not generally entirely airtight. By creating a porous area in the molding element at the interface with the other part of the mold, the removal of air from the mold is improved without the need to make a hole in the other part of the mold. This then makes the mold easier to manufacture.

BRIEF DESCRIPTION OF THE DRAWINGS

Other features and advantages of embodiments of the invention will become apparent from the following description, given by way of nonlimiting example, with reference to the attached drawings in which.

In the description which follows, elements which are substantially identical or similar will be denoted by identical references.

DETAILED DESCRIPTION OF SPECIFIC EMBODIMENTS

Figure 1:
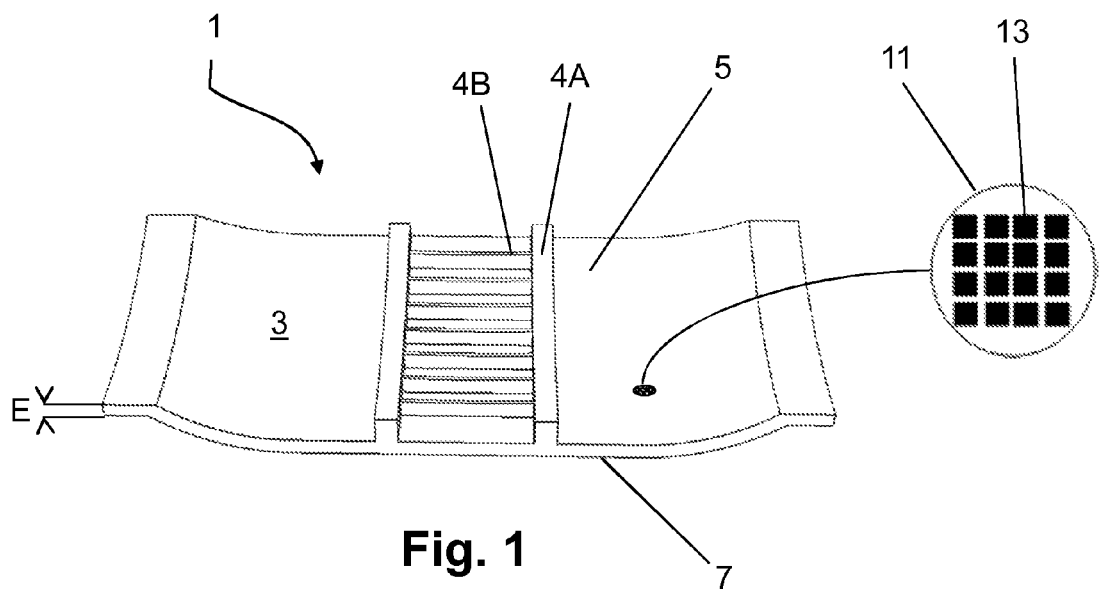
FIG. 1 is a perspective view of a molding element according to an embodiment of the invention.

FIG. 1 is a perspective view of a molding element 1 manufactured from a metallic powder fused together layer by layer. This molding element comprises a body 3 and protrusions 4A, 4B protruding from this body 3. More particularly, the body 3 comprises a first surface 5 and a second surface 7 opposite to the first surface 5. The first surface 5 is intended to mold all or part of a tread surface of a tire and the second surface 7 is intended to come into contact with another part of a mold in which the molding element 1 is attached. The first surface 5 and the second surface 7 define the thickness E of the body 3. This thickness E is comprised between 1 and 6 millimetres. For preference, this thickness is comprised between 2 and 2.5 millimetres. This small thickness gives the molding element a lightness of weight and a flexibility that make it easier to position and hold in place when attached in another mold part.

The molding element 3 further comprises a plate 11. This plate 11 comprises a plurality of holes 13. In this instance, these holes have a square cross section and the diameter of the circle inscribed inside this cross section is comprised between 0.05 mm and 1 mm. As an alternative, the cross section of the holes may be circular, triangular or other. It will be noted that the holes 13 in this instance form a grid structure on the plate 11 and this grid structure is able to mold a pattern on the tire. This pattern may, for example, be a logo, a word or other.

Figure 2:
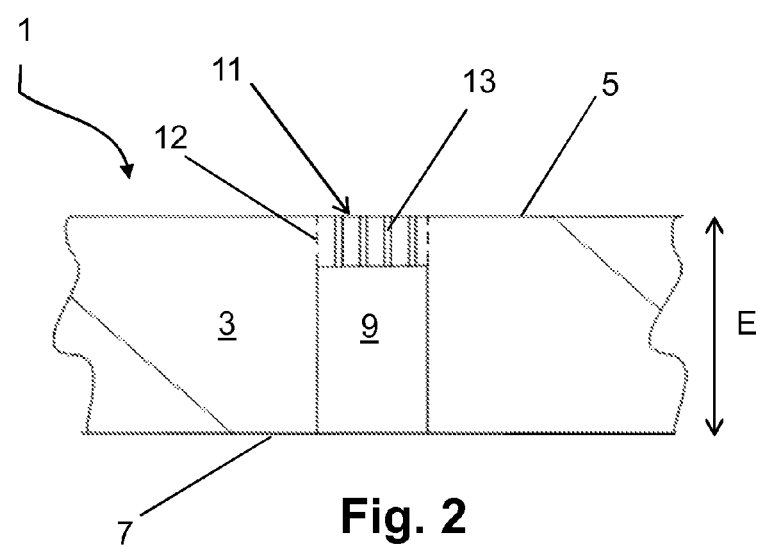
FIG. 2 is an enlargement of a view in cross section of the molding element of FIG. 1 in the region of the venting means.

FIG. 2 depicts the plate 11 in greater detail. This plate 11 is positioned across a cavity 9. "Across" a cavity means that the plate 11 extends in a direction perpendicular overall to the main direction in which this cavity extends. In addition, the plate 11 is formed as one with the body 3 of the molding element. "Formed as one with" means that the body 3 and the plate 11 are formed of the same material during the same manufacturing operation. Thus, the plate 11 constitutes an extension of the body 3 over the cavity 9. However, to make the invention easier to understand, the cavity 9 has been delineated from the body 3 using dotted line 12.

It will be noted that the cavity 9 opens onto the second surface 7 of the body 3 so that the holes 13 in the plate 11 allow air to pass between the first surface 5 of the molding element and the second surface 7 thereof.

It will also be noted that the plate 11 is at the same level as the first surface 5 so that this plate 11 lies flush with this first surface 5.

Figure 3:
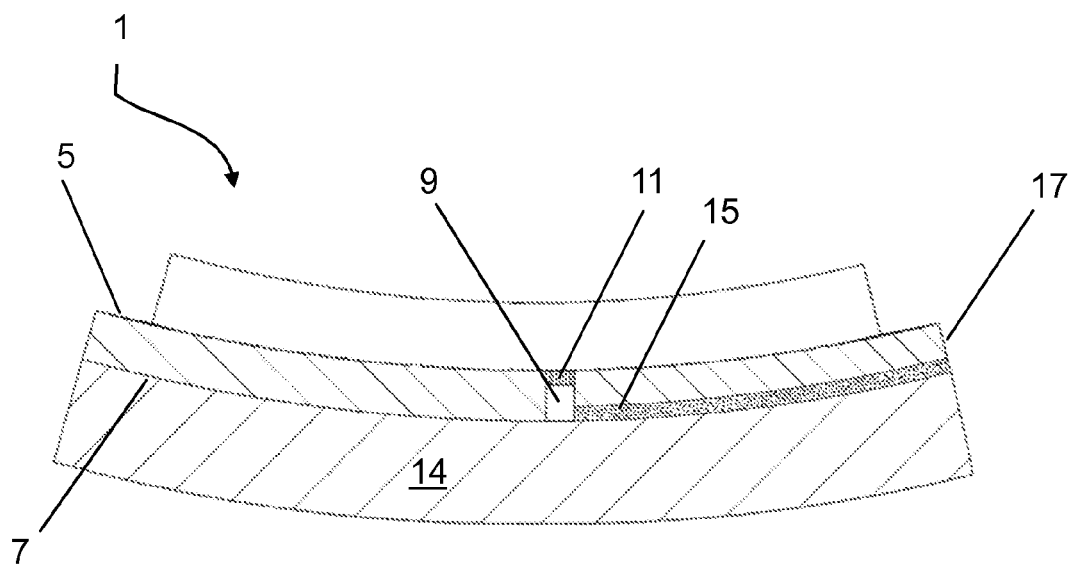
FIG. 3 schematically depicts a view in cross section, in a plane perpendicular to the plane of FIG. 2, of the molding element of FIG. 1 according to a second embodiment.

FIG. 3 is a view in cross section of the molding element 1 according to a second embodiment, in a plane perpendicular to the plane of FIG. 2. The molding element 1 is depicted here as being an element attached to another part 14 of the mold. More specifically, in this embodiment, the molding element 1 comprises a porous area 15. A porous area means an area comprising a plurality of pores that allow air to pass. These pores generate a voids volume in the porous area 15 which is greater than 20%. The porous area 15 here forms part of the second surface 7 of the molding element 1. More particularly, this porous area 15 connects the cavity 9 to a lateral surface 17 of this molding element 1. The lateral surface 17 is the surface of the element 1 that connects the first surface 5 to the second surface 7. In this way, air is removed from the mold via the holes in the plate 11, the cavity 9, and the porous area 15, and this is done without the need to make a hole in the other part 14 of the mold.

Figure 4:
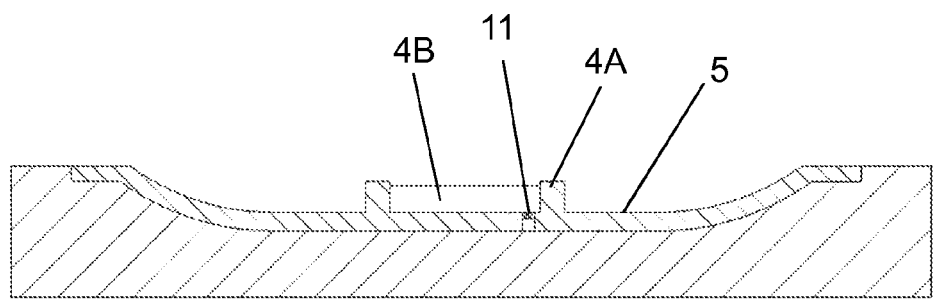
FIG. 4 schematically depicts a view in cross section of a molding element according to the invention according to a third embodiment.

FIG. 4 depicts a third embodiment in which the plate 11 of the molding element 1 opens out at the intersection of two protrusions 4A, 4B. The removal of air from the vicinity of the protrusions when the mold is closed over the green tire is thus improved.

The invention is not restricted to the examples described and depicted and various modifications can be made thereto without departing from its scope.

FIGS. 1 to 4 depict a plate 11 comprising a plurality of holes As an alternative, this plate 11 may comprise just one hole. This hole may, for example, have a circular cross section with a diameter of the order of 0.8 mm.

The invention claimed is:

1. A molding element for a tire mold manufactured from a metallic powder fused together layer by layer, the molding element comprising:
    a body, this body comprising:
        a first surface intended to mold all or part of a tread surface of the tire, and
        a second surface opposite to the first surface and intended to be in contact with another part of the mold,
    wherein the body has a thickness (E) between 1 and 6 millimetres,
    at least one cavity opening onto the second surface of this body,
    a plate positioned across the at least one cavity and formed as one with the body of the molding element, wherein this plate is at the same level as the first surface of the body, and wherein the plate comprises at least one hole allowing air to pass between the first surface of the molding element and the second surface thereof,
    a lateral surface connecting the first surface of the body of the molding element to the second surface thereof,
    a porous area connecting the cavity to the lateral surface, this porous area forming all or part of the second surface of the body of the element and comprising a plurality of pores that allow air to pass and generate a voids volume which is greater than 20%.

2. The molding element according to claim 1, wherein the plate comprises a plurality of holes forming a grid structure on this plate, these holes having an equivalent diameter comprised between 0.05 mm and 1 mm.

3. The molding element according to claim 2, wherein the grid structure of holes forms a marking on the molding element, this marking being able to mold a pattern on the tire.

4. The molding element according to claim 1, further comprising a plurality of protrusions projecting from the first surface of the body of this element and adapted to mold cuts in the tread of the tire, wherein at least two protrusions of the plurality of protrusions intersect on this first surface, and wherein the hole or holes in the plate opens or open at the intersection of the two protrusions.

* * * * *